(12) United States Patent
Frati (10) Patent No.: US 9,068,154 B2
(45) Date of Patent: Jun. 30, 2015

(54) METHOD AND EQUIPMENT FOR REMOVING DISSOLVED OXYGEN FROM GRAPES OR OTHER PLANT PRODUCTS AND FOR MAINTAINING THEM IN A CONTROLLED ATMOSPHERE IN MECHANICAL MEANS FOR HARVESTING, TRANSPORT AND STORAGE

(75) Inventor: Maurizio Frati, Verciano-Lucca (IT)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 642 days.

(21) Appl. No.: 13/254,587

(22) PCT Filed: Mar. 2, 2010

(86) PCT No.: PCT/EP2010/052601
§ 371 (c)(1),
(2), (4) Date: Nov. 21, 2011

(87) PCT Pub. No.: WO2010/100136
PCT Pub. Date: Sep. 10, 2010

(65) Prior Publication Data
US 2012/0093988 A1    Apr. 19, 2012

(30) Foreign Application Priority Data

Mar. 5, 2009 (IT) .............................. MI2009A0319

(51) Int. Cl.
*A23B 7/148* (2006.01)
*C12G 1/02* (2006.01)
(Continued)

(52) U.S. Cl.
CPC . *C12G 1/02* (2013.01); *A23B 7/148* (2013.01); *A23L 3/34095* (2013.01); *A01F 25/14* (2013.01); *C12G 1/005* (2013.01); *A23L 3/3418* (2013.01); *A01D 46/28* (2013.01)

(58) Field of Classification Search
CPC ........ A23B 7/148; A23B 7/152; A23B 7/055; A23B 9/20; A23L 3/3409–3/3418; C12G 1/02; C12G 1/005; A01D 46/28; A01F 25/14
USPC .............. 426/312, 320, 330.5, 335, 418–419, 426/474, 477, 486–487, 809, 599; 62/48.1, 62/48.3, 53.2, 54.2
See application file for complete search history.

(56) References Cited

U.S. PATENT DOCUMENTS

| 1,798,781 A | * | 3/1931 | Brooks | .............................. 62/78 |
| 2,296,349 A | * | 9/1942 | Hunt | .............................. 62/54.2 |

(Continued)

FOREIGN PATENT DOCUMENTS

| EP | 1 096 005 | 5/2001 |
| EP | 1 314 778 | 5/2003 |

(Continued)

OTHER PUBLICATIONS

International Search Report for PCT/EP2010/052601, mailed Feb. 3, 2011.

*Primary Examiner* — Drew Becker
(74) *Attorney, Agent, or Firm* — Christopher J. Cronin (57) ABSTRACT

A method for removing dissolved oxygen from a plant product such as grapes or the like and for maintaining it in a controlled atmosphere when it is placed in mechanical means for harvesting, transport and storage, said means comprising a collection tank which receives the plant product which is present in a solid and a liquid state in this tank, said removal and controlled atmosphere being provided by using an inert gas, said tank having a lower portion or first part and a second upper part or portion into which the product is introduced when being placed in the tank. Provision is made for the use of said inert gas in an initial solid state, its subsequent sublimation and the interaction of the gas in gaseous state thus produced with said product inside the tank.

14 Claims, 4 Drawing Sheets

(51) Int. Cl.
  *A23L 3/3409* (2006.01)
  *A01F 25/14* (2006.01)
  *C12G 1/00* (2006.01)
  *A23L 3/3418* (2006.01)
  *A01D 46/28* (2006.01)

(56) References Cited

U.S. PATENT DOCUMENTS

| | | | | |
|---|---|---|---|---|
| 2,483,064 A | * | 9/1949 | Reich | 62/78 |
| 2,617,351 A | * | 11/1952 | Graham, Jr. et al. | 99/477 |
| 3,102,777 A | * | 9/1963 | Bedrosian et al. | 422/40 |
| 3,163,022 A | * | 12/1964 | Hottenroth | 62/168 |
| 3,233,396 A | * | 2/1966 | Gallo | 56/328.1 |
| 3,714,887 A | * | 2/1973 | Johnson | 99/477 |
| 3,730,443 A | * | 5/1973 | Johnson | 241/82.1 |
| 4,238,511 A | * | 12/1980 | Egretier | 426/15 |
| 4,615,887 A | * | 10/1986 | Hickinbotham | 426/8 |
| 4,874,615 A | * | 10/1989 | Gruenhoff et al. | 426/15 |
| 5,074,126 A | * | 12/1991 | Mahieu | 62/388 |
| 5,156,009 A | * | 10/1992 | Woodruff | 62/78 |
| 5,787,716 A | * | 8/1998 | Allen, Jr. | 62/63 |
| 7,258,889 B2 | * | 8/2007 | Delgado Araujo | 426/634 |
| 2002/0035932 A1 | * | 3/2002 | Chambers | 99/495 |
| 2004/0101606 A1 | * | 5/2004 | Ling et al. | 426/419 |
| 2006/0150641 A1 | * | 7/2006 | Lopez | 62/62 |
| 2007/0292574 A1 | * | 12/2007 | Ling et al. | 426/474 |
| 2011/0268856 A1 | * | 11/2011 | Paetzold | 426/474 |

FOREIGN PATENT DOCUMENTS

| | | |
|---|---|---|
| FR | 2 596 411 | 10/1987 |
| FR | 2 633 808 | 1/1990 |
| FR | 2 731 228 | 9/1996 |
| GB | 434458 * | 9/1935 |
| WO | WO 2004/037966 | 5/2004 |
| WO | WO 2006/122935 | 11/2006 |
| WO | WO 2008/020101 A1 * | 2/2008 |

* cited by examiner

METHOD AND EQUIPMENT FOR REMOVING DISSOLVED OXYGEN FROM GRAPES OR OTHER PLANT PRODUCTS AND FOR MAINTAINING THEM IN A CONTROLLED ATMOSPHERE IN MECHANICAL MEANS FOR HARVESTING, TRANSPORT AND STORAGE

CROSS-REFERENCE TO RELATED APPLICATIONS

This application is a §371 of International PCT Application PCT/EP2010/052601, filed Mar. 2, 2010, which claims §119 (a) foreign priority to Italian patent application MI2009A000319, filed Mar. 5, 2009.

BACKGROUND

1. Field of the Invention

The present invention relates to a method for protecting harvested plant products, for example but not exclusively grapes, by removing the dissolved oxygen and maintaining the products in a controlled atmosphere having a specified composition, according to the preamble of the principal claim. The invention also relates to equipment for the application of the aforementioned method.

2. Related Art

It is known that oxygen dissolved in or in contact with plant substances, particularly liquids of plant origin, is a cause of alterations which are harmful to the preservation of the sensory qualities of the substances. These liquids are generally formed during the operations of harvesting the plant products, especially where such harvesting is carried out with mechanical means.

For example, but not exclusively, reference may be made to grapes, especially in cases in which they are harvested by mechanical means. When compared with conventional manual harvesting, the mechanical harvesting of grapes has considerable advantages in terms of economics and management, enabling the harvesting operations to be conducted at lower cost and in a shorter time.

On the other hand, the use of such a procedure is impeded by problems of degradation of the potential quality of the grapes harvested by this method, which inevitably results in the breaking of the fruits and the outflow of a product in a liquid state known as the must. Since some components of the must are oxidized by contact with the oxygen present in the air, the potential quality is decreased.

This is one factor which sets serious limits on mechanical harvesting methods in cases where the grapes are to be processed into high-quality wines.

SUMMARY OF THE INVENTION

The object of the present invention is to propose a method and equipment for overcoming these limitations by preventing the oxidation of the must by removing the oxygen dissolved therein and protecting both the must and the fruit in an atmosphere having a lower or zero content of oxygen.

A further object of the invention is to propose a method and equipment of the aforementioned type which can be applied and produced in a simple way and at low cost.

These and other objects, which will be evident to those skilled in the art, are achieved by a method and equipment according to the appended claims.

BRIEF DESCRIPTION OF THE FIGURES

To facilitate the understanding of the present invention, the following drawings are attached purely by way of non-limiting examples. In these drawings.

DETAILED DESCRIPTION OF THE INVENTION

Reference will now be made to FIGS. 1, 2, 3, 4, 5 and 6, in which identical reference numerals correspond to identical components.

Figure 1:
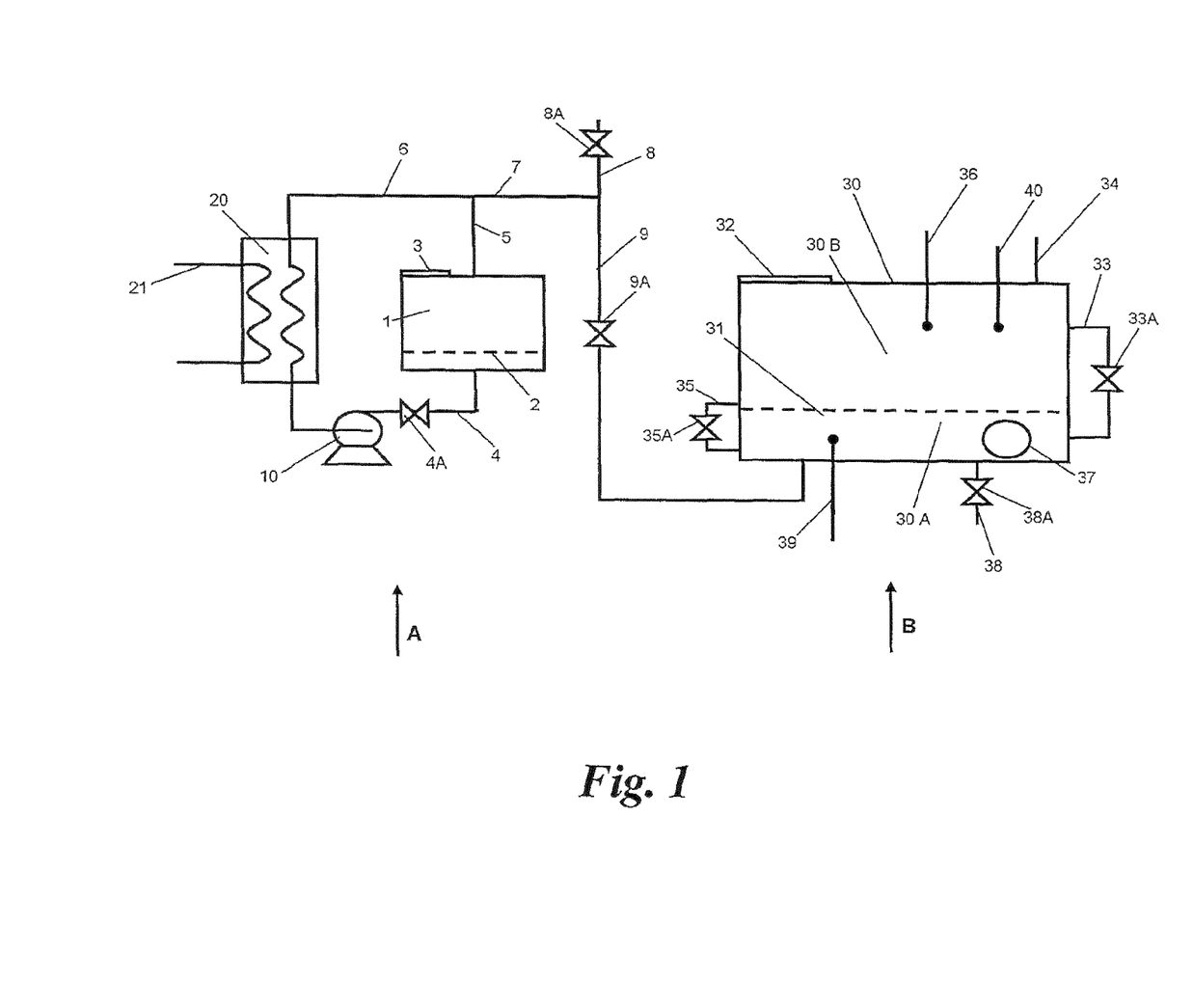
FIG. 1 shows a schematic view of equipment according to the invention.

FIG. 1 shows the whole of the invention, composed of a first part A, comprising components indicated by (1) to (21), for producing gaseous $CO_2$, and another, second part B, comprising components (30) to (40), for containing the harvested product in a deoxygenating protective atmosphere.

FIG. 1 shows a vessel 1 for containing $CO_2$ in the solid state, in powder form, referred to hereinafter as "dry ice", or in the form of pellets or other forms with various dimensions. These solid forms, by way of non-limiting example, are all denoted by the term "solid $CO_2$" in the following text, if they are not described in further detail.

The vessel 1, referred to hereinafter as a "sublimer", is provided with a hatch 3 for filling with solid $CO_2$, a pierced plate or grid 2 for supporting the solid $CO_2$ and allowing the passage and distribution of the gaseous $CO_2$ as described below, and lines for supplying and extracting a gas.

The gas supply line comprises a duct or pipe 4 provided with a valve member 4A for regulating the flow in the aforesaid pipe; the gas extraction line comprises ducts or pipes 5 and 6 and a pump 10. This pump is capable of making the mixture of gases flow between the sublimer 1 and a heat exchange member 20, referred to below as an "exchanger", in which the gas absorbs heat from a fluid supplied from a line 21, becomes heated, and transfers the heat absorbed in this way to the solid $CO_2$ present in the sublimer 1, as a result of which the $CO_2$ sublimes and enters the gaseous state. This line 21 is connected to a heat source for heating the circulating gas, as described below.

The $CO_2$ in the gaseous state produced in this way cannot be absorbed by the internal recycling circuit formed by the ducts 4, 5 and 6, since this circuit has a constant volume and operates at a virtually constant pressure. Consequently the $CO_2$ is allowed to flow out through the pipes 7 and 9 and is directed towards the second part B of the equipment, and in particular towards a tank 30 containing the harvested product to be treated.

The gas can be vented into the air through a pipe 8 and its valve member 8A if necessary.

Part B of the equipment comprises the tank 30 for containing the harvested product; this tank is provided with a separating element or grid 31 to separate the solid parts, namely the fruits in the case of grapes, contained in a first portion 30B of the tank, from the product in the liquid state, which is must in the case of grapes, contained in a second portion 30A of the tank; this part B comprises the duct or pipe 9 for receiving the $CO_2$ in the gaseous state, provided with a regulating valve member 9A, a duct 33, provided with a valve member 33A for transferring the $CO_2$ in the gaseous state from the first portion or lower part 30A to the second portion or upper part 30B of the tank 30, and, if necessary, comprises a hatch 32 for the introduction of the harvested product and for covering the tank, and a further duct 34 for venting the gas into the atmosphere.

A further duct 35 provided with a valve member 35A can transfer the product in the liquid state from the tank portion 30B to the portion 30A if the separator element 31 is not a pierced grid but is simply a supporting element without communicating holes between the portions 30A and 30B.

A duct 38 with a valve member 38A enables the product in the liquid state to be extracted from the lower or first portion 30A of the tank. The product in the solid state can be discharged from the second portion 30B by tipping the tank or by using extraction means such as screws or other known means which are not shown in the drawing.

If the extraction is carried out by tipping, or in any case if the tank 30 is movable with respect to the sublimer 1, the duct 9 is to be made from flexible material so as to allow the tank 30 to move relative to said sublimer.

A measuring device 36 for measuring the composition of the atmosphere present inside the tank can be used to discover the composition of this atmosphere; two temperature gauges 39 and 40, inserted into the first and second portions 30A and 30B of the tank respectively, can be used to discover the temperature of the liquid state and the solid state of the harvested product present in these portions.

If the tank 30 is used without the aid of part A of the equipment which produces gaseous $CO_2$ (components 1 to 21), it is possible to dispense with the supply duct or line 9 and to provide the tank with a hatch 37, placed in part 30A to allow a sufficient quantity of solid $CO_2$ to be introduced into the first portion 30A to develop the necessary amount of the substance in the gaseous state. This development takes place following the contact, and consequent heat exchange, between the solid $CO_2$ and the harvested product in the liquid state, which is must in the case of grapes, which will percolate (or be transferred) from the second portion 30B to the first portion 30A, starting from the moment when the harvested product 30B is introduced.

A brief description is provided below to illustrate the operation of the invention and the method according to the invention.

The generation of the gaseous $CO_2$, hereinafter simply referred to as "gas", takes place as a result of the sublimation of the solid $CO_2$ contained in the sublimer 1 following the contact with the recirculated mixture which is suitably heated in the exchanger 20. In order to obtain $CO_2$ in the gaseous state, the method employed in the present invention uses the process of sublimation of solid $CO_2$ by means of an external heat source by heating the recirculating $CO_2$, and, subsequently, by exchanging heat between the latter and the solid $CO_2$ contained in the sublimer 1, by direct contact between the recirculating gas and the solid $CO_2$.

The exchanger 20 transfers heat to the mixture which passes through it (this mixture initially being composed of air) through the pipe 6, the heat being drawn from a fluid circulating in the line 21 connected to the heat source. The heat source used can be either ambient air or other sources at a higher temperature such as cooling apparatus, for example the radiator, of the engine of the means for harvesting or moving the product.

Ambient air can be used as a heat source because of the sublimation temperature of solid $CO_2$, which, at the pressures at which the invention is applied, that is to say at an atmospheric pressure of up to 4-5 bar, is, to a degree of approximation sufficient for our purposes, within the range from $-78°$ C. to $-50°$ C. These temperatures are suitable for the formation of a good thermal gradient with the external air to contribute to an efficient heat exchange and enable the desired sublimation to take place.

As regards the constructional characteristics of the operation of the invention, namely internal recirculation in part A of the equipment 1, using a circuit composed of the sublimer 1, the pump 10 and the pipes 4, 5 and 6, hereinafter referred to as the "sublimation circuit", a volume of gas equal to the volume of $CO_2$ which is sublimed as a result of the heat exchange with the recirculating mixture flows out of the sublimer 1 through the pipes 5 and 7 and is available for delivery to the tank 30, in which the process of removing the dissolved oxygen and forming an atmosphere composed predominantly or entirely of $CO_2$ takes place.

The $CO_2$ composition of the gas mixture flowing out of the pipe 7 changes to an initial transient level and then reaches high values which, for the purposes of the present invention, can be considered to be those of a pure gas. In particular, when the system is first started up, air is present in the sublimation circuit, this air being subsequently enriched with gaseous $CO_2$ as the operation of the system continues.

For guidance, and with a degree of approximation sufficient for the present purposes, the oxygen content in the mixture present in the pipe 7 can be considered to decrease at least 2.5 times on each sublimation of a quantity of $CO_2$ equal to the volume of the circuit; this means that, after the sublimation of a volume of $CO_2$ equal to four times the volume of the sublimation circuit, the oxygen content in the gas will be less than 1%, which is more than adequate for the purposes of the present invention.

If it is necessary to supply the tank 30 with a gas having a specified reduced oxygen content, venting to the exterior must be carried out, using the pipe 8, until the gas reaches the required value before being supplied to the tank 30.

For practical purposes, since the harvested product arriving in the tank 30 is in contact with the external air, it is not necessary to vent the mixture initially, and the mixture formed in the sublimer 1 can be supplied directly to the tank 30, since in any case this mixture has a lower oxygen content than air.

As regards the constructional characteristics of the sublimer 1, it should be noted that the grid 2 is suitable for the purpose if the solid $CO_2$ is in the form of pellets or blocks of various shapes and sizes, since these forms are characterized in that they allow the gas to pass with a sufficiently uniform distribution over the surfaces of the solid $CO_2$ to provide satisfactory heat exchange.

However, if the solid $CO_2$ is present in the form of powder, or "dry ice" as it is commonly called, the grid 2 may be inadequate because of the tendency of the dry ice to become compacted, thus forming preferential paths with decreased potential for heat exchange and consequently for the sublimation according to the invention.

To overcome the tendency to compaction, where dry ice is used, it is possible to make special arrangements, for example by using hooded dispensers as described more fully below and illustrated in FIGS. 2, 3 and 4.

Figure 2:
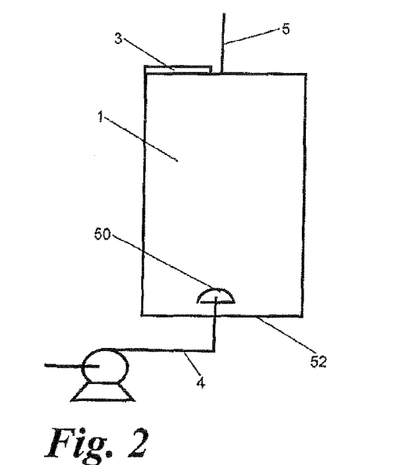
FIG. 2 shows a schematic view of part of the equipment of FIG. 1.

FIG. 2 shows the position of a hood 50 for dispensing the gas on a base 52 placed on the bottom of the sublimer 1.

Figure 3A:
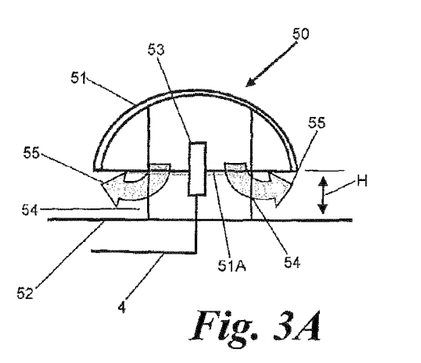
FIGS. 3A and 3B show schematic views of two variants of parts of the equipment of FIG. 1.
Figure 3B:
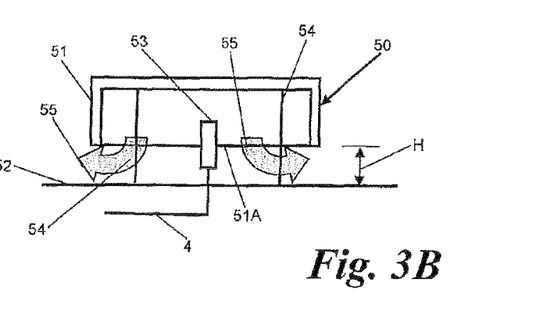

FIGS. 3A and 3B show two possible embodiments of this hood 50 which operate in an identical way, and differ only in their shapes and sizes. In the drawings, the number 51 indicates the upper part, or cupola, of the hood 50, which is of hemispherical shape in the case of FIG. 3A and cubic or parallelepipedal in FIG. 3B. Each of the hoods in the aforesaid drawings has one face 51A which has no closing side piece.

The hood may be made in any of the stated shapes or in any other shape, provided that it allows the formation of a space with a height (H), as shown in FIGS. 3A and 3B, and a perimeter equal to that of the open part of the hood (in the form of a circumference in the case of 3A, or in the form of a base square or rectangle in the case of 3B). The pressure of the gas acts in this space, as described more fully below, to create a force capable of breaking up any compacted areas of the solid $CO_2$, thus enabling the gas to flow out and pass through the body of the dry ice to create an efficient heat exchange.

FIGS. 3A and 3B show how a gas dispenser 53 is located inside the hood; the hood is supported on the base 52 by supports 54. The arrow 55 indicates the flow of the gas out of the face 51A of the hood, this gas being supplied to the dispenser 53 through the duct 4.

Figure 4:
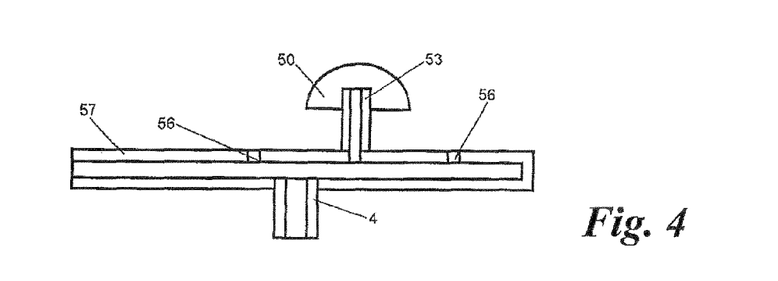
FIG. 4 shows a schematic view of a different part of the equipment of FIG. 1.

FIG. 4 shows a possible location of a hood 50 with a pipe 57, connected to the pipe 4, for supplying it with the gas, said pipe being provided with holes for dispensing the gas 56 directly into the sublimer 1 in the proximity of its base 52. It should be noted that it is possible to place a plurality of hoods 50 and a plurality of holes 56 in the proximity of said base, in suitable geometrical arrangements, to enable the hoods to be used to prevent the formation of any agglomerations, and to enable the holes to be used to improve the distribution of the gas in the body of the solid $CO_2$.

In the invention as described above, the hood is used as a device for multiplying the effect of the pressure by increasing the area to which it is applied, in order to break up any compacted structures. Another arrangement which may be made to avoid the formation of compacted areas, or to break them up if compaction has occurred, is that of making the sublimer 1 vibrate by known methods, this vibration occurring naturally if the sublimer is installed on moving mechanical means such as mechanical grape harvesters.

Another possible arrangement for avoiding the formation of compacted areas is that of providing the sublimer 1 with mechanical agitation, not shown in the drawings, produced by known methods (using internal agitators, for example).

The gas produced in this way in the sublimer 1 is brought into contact with the liquid, which is must if the harvested product is grapes, contained in the lower part of the tank 30A, by a method such as bubbling at a plurality of points, to promote the removal of the dissolved oxygen, after which the gas passes through the grid 31 and mixes with the gaseous state present in the upper part 30B to form therein an atmosphere which has a low oxygen content or is free of oxygen.

Figure 5:
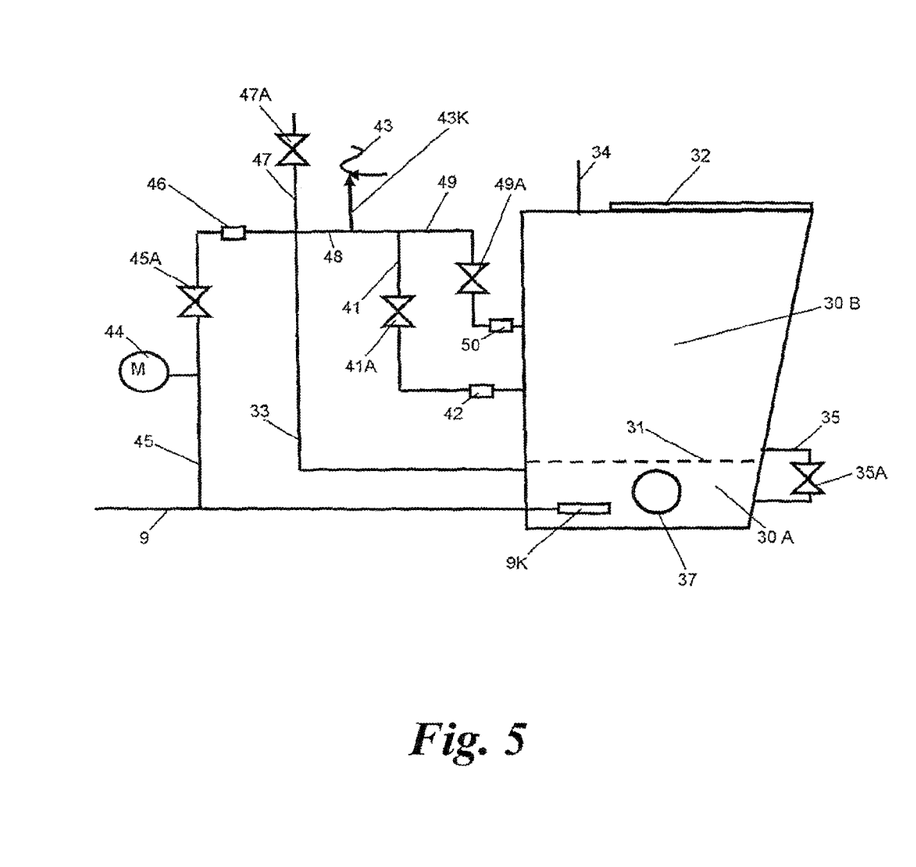
FIG. 5 shows a schematic view of a variant of a part of the equipment of FIG. 1.

FIG. 5 shows a different method for distributing the gas in the upper part 30B of the tank 30 in a case in which the filling of the tank with its contents takes place continuously, as in a mechanical grape harvester, or on a number of separate occasions.

This different embodiment of the invention enables the gas to be directed from the lower part 30A, where it arrives through the supply duct 9, provided with a gas distributor 9K located within the product in the liquid state, to the upper part 30B by initially passing through the pierced grid 31 and then, when this creates excessive resistance to the passage of the gas due to the head of the harvested product present in this upper part 30B, by flowing through the aforesaid duct 33 which is connected to ducts or pipes 48, 41 and 49 provided with valve members 41A and 49A or one-way valves 42 and 50 operating according to a predefined pressure difference between their upstream and downstream sides.

A duct 45 connected to the pipe 9 and provided, if necessary with a detector or pressure gauge M 44, a valve member 45A and a one-way valve 46 operating according to a predefined pressure difference enables the gas to be supplied to the upper part 30B of the tank, through the ducts 48, 41 and 49 in the case in which the excessive presence of the product in the liquid state in 30A impedes, or prevents, the passage of the gas through the duct 33.

To enable the invention to be understood more fully, it should be noted that, since $CO_2$ in the gaseous state is heavier than air, it is possible to make use of this second characteristic of the $CO_2$ to optimize the formation of the protective atmosphere in the second tank portion 30B in contact with the contents. This can be achieved by introducing the $CO_2$ as closely as possible above the surface of the contents, in order to use its density to provide a "piston effect" to displace the mixture lean in $CO_2$ towards the outside, thus minimising phenomena of mixing between the incoming gas and the gas already present which has a lower $CO_2$ content. This makes it possible to obtain a higher $CO_2$ content in the aforesaid part or portion 30B for the same quantity of introduced gas, and consequently a greater reduction in the oxygen content, thus providing more effective protection.

The above facts are even more evident if it is considered that, when the product is loaded into said portion 30B, this operation inevitably creates turbulence in the tank, causing greater mixing with external air in the areas closer to the filling aperture 32.

In FIG. 5, a pipe 47 provided with a valve member 47A can be used to vent the gas to the outside.

The operation of the equipment as shown in FIG. 5 and the application of the method by means of this equipment comprise different operating procedures such as the one which uses only the valve members 45A, 41A and 49A, and in this case the one-way valves 46, 42 and 50 are not present in the equipment.

These different embodiments will now be described.

Use of the Valve Members 45A, 41A and 49A

If the aforesaid valve members are used, the supply of gas commences with the valves 45A, 47A, 41A and 49A closed; thus the gas enters the lower part of the tank 30A through the duct 9 and the distributor 9K and reaches the upper part of the tank 30B by passing through the grid 31.

When the pressure gauge 44 indicates that a specified pressure has been exceeded, making it difficult for the gas to reach the part or portion 30B by passing through the grid 31, the valve 41A is opened and the gas is supplied to the part or portion 30B through the duct 33 and the duct 41.

As the part 30B of the tank continues to be filled up to a level above the outflow of the duct 41 into the tank portion 30B, the gas pressure required to supply the gas increases, and when it has reached a specified level the valve member 49A is opened. Thus the gas is supplied to the part of the tank 30B through the ducts 33 and 49, and is no longer supplied through the duct 41.

If the pressure as detected by the pressure gauge 44 does not decrease following the opening of the valve 41A or of the valves 41A and 49A (indicating the presence of pressure losses in the duct 33), the valve member 45A is opened and the gas is supplied to said part 30B by using the ducts 45, 48, 41 and/or 49, without passing through the part or portion of the tank 30A.

It should be noted that, when the valve member 45A is closed, if there is a total or partial obstruction in the distribution member or distributor 9K, the pressure will rise in the duct 45, and if this rise is such that the valve member 45A has to be opened, the pressure detected by the pressure gauge 44 decreases and the gas flows through the duct 33 into the lower part 30A of the tank, and from there into the upper part 30B through the grid 31. Conversely, if the aforesaid pressure decrease is not present, this means that the passage of the gas through the duct 33 is impeded by both the lower part of the tank 30A and the head of fluid in the upper part 30B.

In this case, the gas is supplied to the second part of the tank 30B without passing through the grid 31, but by using the ducts 48, 41 and/or 49, as described above.

Purely by way of example, the preceding description considers the case in which there are two lines, namely 41 and 49, for supplying gas to the second part 30B of the tank 30. In fact, there may be one or more than two of these lines, depending on the geometrical characteristics of the tank.

If there are more than two supply ducts, the gas is supplied by following preceding procedure extended to cover all the ducts which are present.

All the valve members which have been described, and other functional members of the equipment which may not have been described, but which are commonly used in fluid supply and distribution equipment (such as members for controlling the flow rate, pressure and temperature, as well as the composition) are advantageously operated automatically by programmable logic controllers (PLCs) or similar units capable of reading the values recorded by the aforesaid members and of acting on the valve members by suitable control operations. This unit or units are not shown in the drawings.

Use of One-Way Valves 42, 46, 50

If the aforementioned one-way valves opening according to specified pressure differences are used, the pressure differences must be established in such a way that the pressure difference for opening the one-way valve 46 is greater than the pressure difference for opening the one-way valve 50 and the latter is greater than the pressure difference for opening the one-way valve 42. The purpose of this arrangement is to ensure that, when the valve 46 opens, the valve 42 opens next, and the valve 50 opens subsequently if the flow in the duct 41 is impeded.

The aforementioned pressure differences must be lower than the opening pressure of a safety valve 43 (fitted on a pipe 43K connected to the duct 48) to ensure that the gas is not expelled to the outside through this safety valve 43 instead of being supplied to the parts 30A and/or 30B of the tank 30.

If the above constraints on the opening pressures of the one-way valves are complied with, then the gas supplied to the first part 30A of the tank through the duct 9 and the distributor 9K initially passes through the grid 31 to reach the second part 30B. If the grid is obstructed, or impedes the creation of a pressure drop required to allow the gas to flow which is greater than that required to make the $CO_2$ flow from the supply duct 41 with the one-way valve 42, the gas passes through the ducts 33, 48 and 41.

If resistance to the passage of the gas through the supply duct 33 is simultaneously created in the latter, for example as a result of a blockage or the complete filling of the first part 30A of the tank 30, and if this resistance is greater than that present in the duct 45 and the one-way valve 46, the gas will flow through the duct 45.

If the above constraints on the opening pressures of the one-way valves are complied with, then the gas supplied to the first part 30A of the tank 30 through the duct 9 and the distributor 9K initially passes through the grid 31 to reach the second part 30B. If the grid is obstructed, or impedes the creation of a pressure drop required to allow the gas to flow which is greater than that required to make the $CO_2$ flow from the supply duct 41 with the one-way valve 42, the gas passes through the ducts 33, 48 and 41.

If resistance to the passage of the gas through the supply duct 33 is simultaneously created in the latter, for example as a result of a blockage or the complete filling of the first part 30A of the tank 30, and if this resistance is greater than that present in the duct 45 and the one-way valve 46, the gas will flow through the duct 45.

Clearly, if there is a plurality of connections for the introduction of the gas into the tank, the procedure continues with cyclic repetition of the above processes.

To facilitate understanding, and without in any way detracting from the general applicability of the invention, an example of the invention is described below using numerical values.

It will be assumed that the maximum possible pressure in the circuit is 0.3 bar (for example because the circuit is provided with a safety valve 43 which is triggered at 0.3 bar), and that the gas is to be made to pass through the grid 31 until a head of harvested product of less than 50 cm is present above the grid, this being assumed to be equivalent, by way of example and provided that the harvested product has the same density as water, to a pressure of 0.05 bar generated in the first part of the tank 30A. If the opening pressure of the one-way valve 42 is set to 0.05 bar (and if the outflow of the duct 41 into the portion 30B is placed at a height of more than 50 cm with respect to the grid 31, for example at 60 cm), then when this pressure is exceeded in the first part 30A the gas will flow into the second part 30B through the ducts 33, 48 and 41, passing through the one-way valve 42.

Similarly, if the opening pressure of the one-way valve 50 is set at a higher level than that of the valve 42, for example at 0.09 bar (in other words when the second part 30B is filled with fluid to a level 40 cm above the outflow of the duct 41 into it), then when this value is exceeded in the ducts 48 and 49 the gas will flow to the second part of the tank 30B through the duct 49, assuming, obviously, that the outflow of this duct into the portion 30B has been placed at a height of more than 40 cm above the outflow of the duct 41 into the portion 30B.

Furthermore, if, by way of non-limiting example, the pressure for opening the one-way valve 46 is set at 0.1 bar, then, if the gas in the circuit formed by the duct 9 and the distributor 9K encounters a resistance of more than 0.1 bar to its passage, it will be supplied to the first part 30A of the tank 30 through the ducts 45 and 33. If the duct 33 also offers excessive resistance, for example due to the resistance to the passage of the gas through the grid 31 or due to the head of fluid present in the second part of the tank 30B, the gas will pass through the ducts 45, 48 and 41 or 45, 48 and 49, and will thus be supplied to the part 30B of the tank 30.

The choice of the ducts through which the gas flows, namely 45, 48 and 41 or 45, 48 and 49, will therefore depend on the minimum resistance present in 41 and 42 respectively. This choice is made automatically as a function of the choice of the pressures required for opening the one-way valves 42, 46 and 50.

Figure 6:
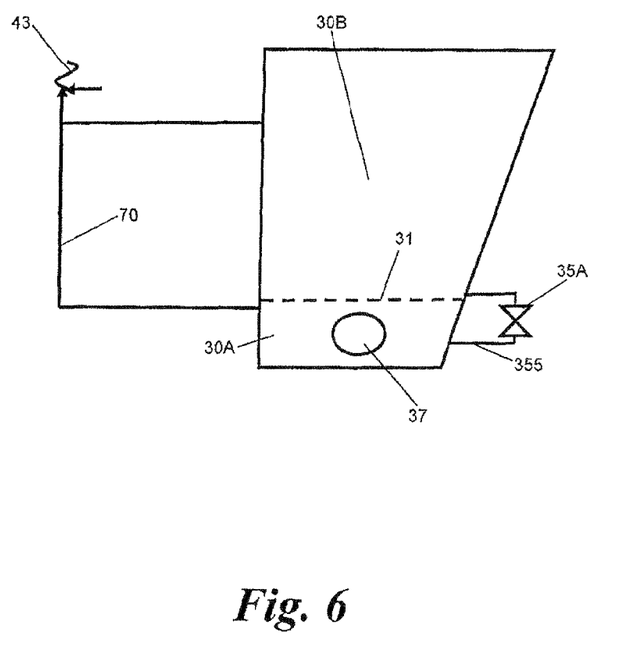
FIG. 6 shows a schematic view of a simplified version of the equipment of FIG. 1.

FIG. 6 shows a simplified version of the invention, in which the gas is formed from solid $CO_2$ by placing the latter directly in the first part or lower portion 30A of the tank 30 before the commencement of the loading of the harvested product into the second part or upper portion 30B of the tank. When the harvested product has been loaded in, its liquid state enters the first part of the tank 30A by percolating through the grid 31, or, if the grid is made with a closed base, through the duct 35 provided with a valve member 35a.

On reaching the lower part 30A, the product in the liquid state, in contact with the solid $CO_2$, transfers heat to the latter which sublimes and flows into the second portion 30B, either by passing through the pierced grid 31 or through a duct 70, in a similar way to that described above.

The solid $CO_2$ placed in the part 30A starts to sublime even before the product in the liquid state percolates on to it, since the solid $CO_2$ absorbs the heat required for its sublimation from the contact with the part 30A itself; this fact does not invalidate the invention, since the gaseous $CO_2$ formed in this way contributes to the decrease of the oxygen present in the container, and therefore, when the liquid percolates into the container, the atmosphere is already suitable for its treatment.

However, in order to limit the sublimation in the absence of harvested product, as described above, it is possible to insulate the part 30A thermally, which in any case will be done if it is desired to supply a quantity of solid $CO_2$ to the aforesaid part 30A such that it not only deoxygenates and protects the content, but also cools the liquid component contained therein.

The duct 70 can be provided with a one-way valve which opens at a specified pressure. This valve is not shown in the drawings, since its operation is similar to that described above.

Various embodiments of the invention have been described. However, other embodiments are possible in accordance with the above description and are to be considered as falling within the scope of the following claims.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for removing the oxygen dissolved in, and maintaining the oxygen in a controlled atmosphere of, plant products that are introduced into mechanical harvesting, transporting and storage device, said device including a collection tank, the plant products being present in said tank in both liquid and solid states, said method comprising the steps of:
    flowing a stream of a fluid into a sublimer containing solid $CO_2$, thereby subliming the solid $CO_2$ and forming a gaseous stream of $CO_2$-enriched fluid, the sublimer fluidly communicating with an interior of the tank via at least one pipe; and
    removing oxygen dissolved in the liquid state of the plant product and controlling an amount of oxygen in an atmosphere in the collection tank by applying said gaseous stream of $CO_2$-enriched fluid to the liquid state of the plant products, wherein:
        said application of said gaseous stream of $CO_2$-enriched fluid to the liquid state from the sublimer is performed while the solid $CO_2$ is being sublimed; and
        an oxygen level in the $CO_2$-enriched fluid is controlled by venting amounts of the $CO_2$-enriched fluid from the sublimer via a vent until a desired oxygen level in the $CO_2$-enriched fluid is achieved.

2. The method of claim 1, wherein:
    the collection tank is provided with a separating pierced element defining in said collection tank a lower portion and an upper portion;
    the product is introduced in said upper portion; and
    after sublimation of $CO_2$ from the solid state in said sublimer, said gaseous stream of CO2-enriched fluid is introduced into the lower portion of the collection tank, the CO2-enriched fluid being transferred into the upper portion by moving inside said collection tank through the pierced element or flowing in at least one duct located outside the collection tank and connecting said lower and upper portions thereof together.

3. The method of claim 1, wherein said stream of fluid is first heated outside the sublimer by flowing the stream of fluid in an exchanger in which said stream of fluid absorbs heat from a different fluid, before flowing into the sublimer.

4. The method of claim 3, wherein said stream of fluid, that absorbs heat from a different fluid, flows into said exchanger through a heating line connected to a heat source, the heat source being selected from the group consisting of the ambient atmosphere, a heating circuit, and an engine of a product harvester, said collection tank being connected to said harvester.

5. The method of claim 1, wherein the oxygen present within the collection tank, upon termination of delivery of the stream of CO2-enriched fluid into the collection tank, is in percentage terms between 0.5% and 10% of the overall gas volume in the collection tank.

6. The method of claim 1, wherein the plant product comprises grapes.

7. The method of claim 1, wherein the oxygen is completely removed from said collection tank.

8. The method of claim 1, wherein the fluid initially forming said gaseous stream is air.

9. A system for removing the oxygen dissolved in, and maintaining a level of oxygen in a controlled atmosphere of, a plant product present in both liquid and solid phases in a mechanical harvesting, transporting and storage device, said system comprising a collection tank for inclusion in the mechanical harvesting, transporting, and storage device, a gaseous CO2-enriched fluid feed line, and a sublimation circuit, wherein:
    said collection tank is provided with a separated piercing element defining in said collection tank a lower portion and an upper portion, said collection tank receiving said product in both liquid and solid states;
    said sublimation circuit comprises:
        a sublimer container adapted to contain and sublime solid $CO_2$ to produce a flow of a gaseous $CO_2$-enriched fluid,
        a heat exchanger,
        ducts directing the flow of the gaseous CO2-enriched fluid into and out said heat exchanger and into and out of said sublimer,
        a vent for venting an atmosphere within said sublimation circuit and reducing an oxygen level of the gaseous CO2-enriched fluid until a desired oxygen level in the $CO_2$-enriched fluid is achieved, and
        a heating line receiving fluid heated by a heat source and feeding said heated fluid to said heat exchanger;
    said heat exchanger is adapted and configured to exchange heat between the heated fluid and the flow of the gaseous CO2-enriched fluid;
    the heat source is selected from the group consisting of an ambient atmosphere, a heating circuit; and an engine of a mechanical harvesting, transporting and storage device;
    said sublimer is separated from the collection tank; and
    said gaseous CO2-enriched fluid feed line is in fluid communication between said sublimation circuit and said lower portion of said collection tank for applying the gaseous CO2-enriched fluid to the product in said collection tank and for removing at least some of the oxygen dissolved in the liquid phase of the product contained in said collection tank and maintaining an oxygen level in an atmosphere inside said collection tank, wherein said system is configured to:
vent an atmosphere within the sublimation circuit until a desired oxygen level in the $CO_2$-enriched fluid is achieved, and
feed gaseous CO2-enriched fluid from the sublimer to the collection tank via said gaseous CO2-enriched fluid feed line as solid CO2 in the sublimer is being sublimated.

10. The system of claim 9, wherein the sublimer comprises a base disposed adjacent a bottom of the sublime, a hood over and spaced from the base, and a gas dispenser disposed between the hood and base, said sublimer being adapted to sublimate said CO2 in the solid state, said base, hood, and gas dispenser being spaced apart from a lower wall or base of the sublimer so as to create, below said base, hood, and gas dispenser, a free space in which the diffused CO2-enriched fluid exerts a force such that the diffused CO2-enriched fluid can pass through the CO2 still in the solid phase.

11. The system of claim 10, wherein said gas dispenser is connected to said CO2-enriched fluid feed line.

12. The system of claim 9, wherein the collection tank containing the product has at least one duct located outside the collection tank that connects said lower and upper portions of the collection tank.

13. The system of claim 9, further comprising an agitator for agitating the CO2 in the solid state placed in the sublimer.

14. The system of claim 9, wherein the plant product comprises grapes.

* * * * *